United States Patent
Riedel et al.

(10) Patent No.: US 12,505,647 B2
(45) Date of Patent: Dec. 23, 2025

(54) SYSTEM AND METHOD FOR EFFICIENTLY CHECKING MEDIA CONTENT FOR ERRORS

(71) Applicant: Viacom International Inc., New York, NY (US)

(72) Inventors: Gregg William Riedel, New York, NY (US); Hardys Christ Eggum, New York, NY (US)

(73) Assignee: Viacom International Inc., New York, NY (US)

( * ) Notice: Subject to any disclaimer, the term of this patent is extended or adjusted under 35 U.S.C. 154(b) by 363 days.

(21) Appl. No.: 18/174,154

(22) Filed: Feb. 24, 2023

(65) Prior Publication Data
US 2024/0290068 A1 Aug. 29, 2024

(51) Int. Cl.
*G06V 10/74* (2022.01)
*G06T 3/40* (2024.01)
(Continued)

(52) U.S. Cl.
CPC ............ *G06V 10/761* (2022.01); *G06T 3/40* (2013.01); *G06T 7/11* (2017.01); *G06V 10/56* (2022.01);
(Continued)

(58) Field of Classification Search
CPC ........ G06V 10/761; G06V 10/56; G06T 3/40; G06T 7/11; G06T 2207/10024;
(Continued)

(56) References Cited

U.S. PATENT DOCUMENTS

| | | | |
|---|---|---|---|
| 8,947,595 B1 * | 2/2015 | Tucker | ............... H04N 21/2743 348/445 |
| 2008/0025400 A1 * | 1/2008 | Sugimoto | ............ H04N 19/176 375/240.16 |

(Continued)

FOREIGN PATENT DOCUMENTS

| | | | |
|---|---|---|---|
| CN | 113949899 | | 1/2022 |
| JP | 2007110189 A | * | 4/2007 |
| KR | 20220165121 A | * | 12/2022 |

*Primary Examiner* — Amandeep Saini
*Assistant Examiner* — Daniella M. DiGuglielmo
(74) *Attorney, Agent, or Firm* — Fay Kaplun & Marcin, LLP (57) ABSTRACT

A system and method are for comparing video content with different attributes. The method includes determining for first and second renditions of video content respective first and second values for each video attribute of the first and second renditions; identifying video attributes for which the first value is different from the second value; determining scaling or adjustment parameters for matching or normalizing the first and second values; generating a transformed rendition of the first rendition having an adjusted value for the first video attribute so that the video attributes of a transformed first rendition match those of the second rendition or a transformed second rendition; and performing a comparative analysis between the transformed first rendition and the second rendition or the transformed second rendition to identify frames in which a comparative performance metric indicates an error or issue in the first rendition or the second rendition.

25 Claims, 4 Drawing Sheets

(51) Int. Cl.
*G06T 7/11* (2017.01)
*G06V 10/56* (2022.01)
*H04N 7/01* (2006.01)
*H04N 21/234* (2011.01)
*H04N 21/2343* (2011.01)
*H04N 21/44* (2011.01)
*H04N 21/4402* (2011.01)
*H04N 23/741* (2023.01)

(52) U.S. Cl.
CPC ........... *H04N 7/013* (2013.01); *H04N 21/234* (2013.01); *H04N 21/234381* (2013.01); *H04N 21/44008* (2013.01); *H04N 21/4402* (2013.01); *H04N 23/741* (2023.01); *G06T 2207/10024* (2013.01); *G06T 2207/20132* (2013.01); *G06T 2207/20208* (2013.01)

(58) Field of Classification Search
CPC ........... G06T 2207/20132; G06T 2207/20208; H04N 7/013; H04N 23/741; H04N 21/234; H04N 21/234381; H04N 21/4402; H04N 21/44008
See application file for complete search history.

(56) References Cited

U.S. PATENT DOCUMENTS

| | | | |
|---|---|---|---|
| 2011/0007168 A1* | 1/2011 | Nagara | H04N 19/182 455/344 |
| 2012/0114046 A1* | 5/2012 | Gordon | H04N 21/440218 375/E7.076 |
| 2012/0162505 A1* | 6/2012 | Vanderhoff | H04N 17/00 348/E7.003 |
| 2015/0326846 A1* | 11/2015 | Stec | H04N 13/178 348/43 |
| 2018/0302663 A1* | 10/2018 | Yoshizawa | H04N 21/4312 |

* cited by examiner

```
grid_size = 16;
grid_area = 256;
for (y=0; y<height; y++)
{
        for (x=0; x<width; x++)
        {
                cell_index = ((grid_area*y)/height) + ((x*grid_size)/width);
                accumulate_red[cell_index] += image[x,y].red;
                accumulate_green[cell_index] += image[x,y].green;
                accumulate_blue[cell_index] += image[x,y].blue;
                accumulate_count[cell_index]++;
        }
}
for (i=0; i<grid_area;i++)
{
        average_red[i] = accumulate_red[i] / accumulate_count[i];
        average_green[i] = accumulate_green[i] / accumulate_count[i];
        average_blue[i] = accumulate_blue[i] / accumulate_count[i];
}
```

Algorithm 503

SYSTEM AND METHOD FOR EFFICIENTLY CHECKING MEDIA CONTENT FOR ERRORS

BACKGROUND INFORMATION

In media operations it is common for multiple different renditions or renditions of the same media content to be delivered to a content host from a content provider. In one example, the content host can receive both a high definition (HD) rendition of video content and an ultra-high definition (UHD) rendition of the same video content, for example, where the UHD rendition is delivered from the content provider to the content host at a time later than the delivery by the content provider of the HD rendition for to the same or a different content host.

A quality control (QC) analysis is generally performed for received media content prior to release by the content host. These QC analyses may include, for example, a suite of automated tests as well as a manual review by a QC operator. As would be understood by those skilled in the art, such a manual review typically comprises watching the video content in full to determine whether further issues exist that were not flagged by the automated tests. After the QC analysis, any detected errors may be corrected at the content host, or the content host may request a corrected rendition of the media from the content provider. Further QC analyses/corrections may then be performed until a rendition of the content passes the QC tests and is validated for release.

The visual QC review is time-consuming, particularly for media content released in multiple renditions each of which must be visually reviewed.

SUMMARY

Some exemplary embodiments of the present disclosure relate to a method for comparing video content with different attributes. The method includes determining for a first rendition of video content a first value for each of a plurality of video attributes of the first rendition of the video content; determining for a second rendition of the video content a second value for each of the video attributes of the second rendition of the video content, the video attributes of the first and second renditions including parameters associated with a playout of the video content; identifying a first one of the video attributes for which the first value is different from the second value; determining scaling or adjustment parameters for matching or normalizing the first and second values of the first video attribute; generating a transformed rendition of at least the first rendition having an adjusted value for the first video attribute so that the video attributes of a transformed first rendition match the video attributes of the second rendition or a transformed second rendition; and performing a comparative analysis between the transformed first rendition and the second rendition or the transformed second rendition to identify frames in which a comparative performance metric indicates an error or issue in the first rendition or the second rendition.

In an embodiment, the first video attribute relates to frame or image properties, color properties, or a frame rate of the video content that, when generating the transformed rendition, are adjusted up or down.

In an embodiment, the first video attribute comprises a resolution, the first value of the first video attribute indicating a first resolution different from a second resolution indicated by the second value of the first video attribute, the transformed first rendition having a transformed first resolution matching the second resolution or a transformed second resolution of the transformed second rendition.

In an embodiment, the first video attribute further comprises an aspect ratio, the first value of the first video attribute indicating a first aspect ratio different from a second aspect ratio of the second rendition indicated by the second value of the first video attribute, the transformed first rendition having the first aspect ratio or a transformed first aspect ratio matching the second aspect ratio or a transformed second aspect ratio of the transformed second rendition.

In an embodiment, the resolution of one of the first or second renditions is 1080p high definition (HD) and the resolution of the other one of the first or second renditions is 2160p Ultra HD (UHD).

In an embodiment, the first video attribute comprises black bar properties introduced in letterboxing or pillarboxing, the first rendition having first black bar properties different from second black bar properties of the second rendition, the transformed first rendition having transformed first black bar properties matching the second black bar properties of the second rendition or transformed second black bar properties of the transformed second rendition.

In an embodiment, the first video attribute comprises a dynamic range for a color space, the first value of the first video attribute indicating a first dynamic range different from a second dynamic range indicated by the second value of the first video attribute, the transformed first rendition having a transformed first dynamic range matching the second dynamic range or a transformed second dynamic range of the transformed second rendition.

In an embodiment, the dynamic range of one of the first or second renditions is standard dynamic range (SDR) and the dynamic range of the other one of the first or second renditions is high dynamic range (HDR).

In an embodiment, the first video attribute comprises the frame rate, the first value of the first video attribute indicating a first frame rate different from a second frame rate indicated by the second value of the first video attribute, the transformed first rendition having a transformed first frame rate matching the second frame rate of the second rendition or a transformed second frame rate of the transformed second rendition.

In an embodiment, the method further includes determining for a first rendition of audio content first values for each of a plurality of audio attributes and for a second rendition of audio content second values for each of the audio attributes, the audio attributes including parameters associated with a playout of the audio content; identifying a first audio attribute for which the first value is different from the second value; determining transformation parameters for matching or normalizing the first and second values of the first audio attribute; generating a transformed rendition of at least the first rendition having an adjusted value for the first audio attribute so that the audio attributes of a transformed first rendition match the audio attributes of the second rendition or a transformed second rendition; and performing a comparative analysis between the transformed first rendition and the second rendition or the transformed second rendition to identify frames in which a comparative performance metric indicates an error or issue in the first rendition or the second rendition.

In an embodiment, the first audio attribute relates to a codec, a sampling frequency, or a number of channels of the audio content that, when generating the transformed rendition, are adjusted to a new value.

In an embodiment, the first audio attribute comprises the number of channels, the first rendition having either stereo sound or surround sound and the second rendition having the other one of either stereo sound or surround sound, the transformed first rendition having a transformed first number of channels matching a number of channels of the second rendition or a transformed number of channels of the transformed second rendition.

In an embodiment, the transformed first rendition has an adjusted value for a first video attribute and the transformed second rendition is generated having an adjusted value for a second one of the video attributes.

In an embodiment, the method further includes analyzing the first and second renditions to identify the first and second values for the video attributes and initial errors.

In an embodiment, the method further includes tuning the comparative analysis based on the scaling or adjustment parameters.

In an embodiment, the method further includes analyzing results of the comparative analysis to identify errors in the first or second renditions.

In an embodiment, the method further includes identifying individual frames or frame ranges as including errors based on the results of the comparative analysis.

In an embodiment, the method further includes presenting the results of the comparative analysis on a display, the results including individual frames or frame ranges in which an error was detected or a plot of the comparative analysis results per frame.

In an embodiment, the method further includes providing the individual frames or frame ranges in which an error was detected for manual review.

In an embodiment, the method further includes generating further transformed renditions of the first and second renditions to reduce a computational complexity of the comparative analysis.

In an embodiment, the further transformed renditions comprise dividing each frame into a grid of cells and averaging pixels of each cell.

In an embodiment, the comparative analysis is performed on averaged pixels of the further transformed renditions.

In an embodiment, the comparative analysis includes a peak signal to noise ratio (PSNR) analysis.

In an embodiment, the first rendition or the second rendition was previously determined to be free of errors so that the error or issue identified by the comparative analysis indicates an error in the other one of the first rendition or the second rendition that was not previously determined to be free of errors.

In an embodiment, the first video attribute is an aspect ratio and wherein, when generating the transformed rendition, at least one portion of each of images of the first rendition is cropped and/or panned to match an aspect ratio of the second rendition or a transformed second rendition.

In addition, the present disclosure relates to a system for comparing video content with different attributes. The system includes a processor configured to determine for a first rendition of video content a first value for each of a plurality of video attributes of the first rendition of the video content; determine for a second rendition of the video content a second value for each of the video attributes of the second rendition of the video content, the video attributes of the first and second renditions including parameters associated with a playout of the video content; identify a first one of the video attributes for which the first value is different from the second value; determine scaling or adjustment parameters for matching or normalizing the first and second values of the first video attribute; generate a transformed rendition of at least the first rendition having an adjusted value for the first video attribute so that the video attributes of a transformed first rendition match the video attributes of the second rendition or a transformed second rendition; and compare the transformed first rendition and the second rendition or the transformed second rendition to identify frames in which a comparative performance metric indicates an error or issue in the first rendition or the second rendition.

Furthermore, the present disclosure relates to a method for preparing first content data comprising a first rendition of a media content asset for comparison to second content data comprising a second rendition of the media content asset. The method includes comparing the first content data to the second content data to identify synchronization differences between the first and second content data, where each synchronization difference is indicated by a difference in media content between the first content data for a first time as compared to the second content data for the first time; and when the second content data has already completed a quality control (QC) review, identifying the differences between the first and second content data as synchronization errors in the first content data.

In an embodiment, the method further includes identifying a second time in the first content data for which the media content of the first content data matches a portion of the media content of the second content data, wherein the second time is after the first time.

In an embodiment, the method further includes generating synchronization data indicating that a first portion of the first content data from a beginning of the first content data to the first time synchronizes with a first portion of the second content data from a beginning of the second content data to the first time and that a second portion of the first content data beginning at the second time synchronizes with a portion of the second content data beginning at a third time within the second content data.

In an embodiment, the method further includes transforming the first content data in a manner configured to simplify an identification of synchronization differences between the first and second content data.

In an embodiment, the step of transforming the first content data includes 1) scaling down each of a plurality of images of the first content data to a corresponding lower resolution image; or 2) dividing each of the images of the first content data into a grid of cells wherein each cell includes a plurality of pixels and assigning to each cell a value corresponding to an average of color values of each of the pixels in the cell.

In an embodiment, the method further includes classifying detected synchronization errors as including one of shuffled frames, missing frames, or extra frames.

In an embodiment, the identification of synchronization differences is based on a comparison of audio data from the first and second content data.

In an embodiment, the identification of synchronization differences is based on a comparison of PSNR values for corresponding portions of the first and second content data.

In an embodiment, the identification of synchronization differences is based on a comparison of the PSNR values from a video component of corresponding portions of the first and second content data.

In an embodiment, the method further includes when a first synchronization error is detected, checking a portion of the first content data after the first time to identify a time at which the first content data matches a portion of the second content data following the first time to identify a second time in the first content data at which the first synchronization error ends and re-synchronizing the first and second content data by comparing a portion of the first content data starting at the second time to a time in the second content data which corresponds to the first content data at the second time.

In an embodiment, the method is performed on a processor operating an automated video analysis of the first and second content data.

In an embodiment, a synchronization error is identified when the PSNR value for one or more frames drops below a threshold level.

In an embodiment, when the PSNR value for a frame drops below 30.

In addition, the present disclosure relates to a system for preparing first content data comprising a first rendition of a media content asset for comparison to second content data comprising a second rendition of the media content asset. The system includes a processor configured to transform the first content data in a manner configured to simplify an identification of synchronization differences between the first and second content data by 1) scaling down each of a plurality of images of the first content data to a corresponding lower resolution image or 2) dividing each of the images of the first content data into a grid of cells wherein each cell includes a plurality of pixels and assigning to each cell a value corresponding to an average of color values of each of the pixels in the cell; transform the second content data by 1) scaling down each of a plurality of images of the second content data to a corresponding lower resolution image or 2) dividing each of the images of the second content data into a grid of cells wherein each cell includes a plurality of pixels and assigning to each cell a value corresponding to an average of color values of each of the pixels in the cell; compare the transformed first content data to the transformed second content data to identify synchronization differences between the first and second content data; and when the second content data has already completed a quality control (QC) review, identify the differences between the first and second content data as synchronization errors in the first content data.

Also, the present disclosure relates to a method for preparing first content data comprising a first rendition of a media content asset for comparison to second content data comprising a second rendition of the media content asset. The method includes transforming the first content data in a manner configured to simplify an identification of synchronization differences between the first and second content data by 1) scaling down each of a plurality of images of the first content data to a corresponding lower resolution image or 2) dividing each of the images of the first content data into a grid of cells wherein each cell includes a plurality of pixels and assigning to each cell a value corresponding to an average of color values of each of the pixels in the cell; transforming the second content data by 1) scaling down each of a plurality of images of the second content data to a corresponding lower resolution image or 2) dividing each of the images of the second content data into a grid of cells wherein each cell includes a plurality of pixels and assigning to each cell a value corresponding to an average of color values of each of the pixels in the cell; comparing the transformed first content data to the transformed second content data to identify synchronization differences between the first and second content data; and when the second content data has already completed a quality control (QC) review, identifying the differences between the first and second content data as synchronization errors in the first content data.

In an embodiment, the method further includes identifying a first time at which a first synchronization difference is indicated by a difference in media content between the first content data and the second content data for the first time.

In an embodiment, the method further includes identifying a second time in the first content data for which the media content of the first content data matches the media content of the second content data, wherein the second time is after the first time.

In an embodiment, the method further includes generating synchronization data indicating that a first portion of the first content data from a beginning of the first content data to the first time synchronizes with a first portion of the second content data from a beginning of the second content data to the first time and that a second portion of the first content data beginning at the second time synchronizes with a portion of the second content data beginning at a third time in the second content data.

In an embodiment, the method further includes classifying detected synchronization errors as including one of shuffled frames, missing frames, or extra frames.

In an embodiment, the identification of synchronization differences is based on a comparison of audio data from the first and second content data.

In an embodiment, the identification of synchronization differences is based on a comparison of PSNR values for corresponding portions of the first and second content data.

In an embodiment, the identification of synchronization differences is based on a comparison of the PSNR values from a video component of corresponding portions of the first and second content data.

In an embodiment, the method is performed on a processor operating an automated video analysis of the first and second content data.

In an embodiment, a synchronization error is identified when the PSNR value for one or more frames drops below a threshold level.

In an embodiment, when the PSNR value for a frame drops below 30.

BRIEF DESCRIPTION OF THE DRAWINGS

FIG. 1b shows a frame of a UHD rendition of the same video content of FIG. 1a.

DETAILED DESCRIPTION

The exemplary embodiments may be further understood with reference to the following description and the related appended drawings, wherein like elements are provided with the same reference numerals. The disclosed embodiments describe a system and method for comparing different renditions of the same media content to one another in an automated process to identify differences indicative of potential errors in one of the renditions.

For example, a QC analysis according to the disclosed embodiments may compare a second rendition of media content to a first rendition that has already been validated (e.g., determined via automated and manual QC review as free of issues (or including issues minor enough to be ignored)). Differences between these renditions may then be identified to flag potential errors or issues in the second rendition. Existing techniques for image/video comparison are typically unable to successfully compare video content having different technical attributes/parameters (e.g., different resolutions, aspect ratios, frame rates, color spaces, or audio parameters) to identify such potential errors.

The exemplary embodiments relate to systems and methods for performing quality control (QC) analyses on multiple different renditions of a media content asset. In particular, the exemplary embodiments describe pre-processing operations for normalizing and/or otherwise transforming the parameters or attributes of one or multiple ones of the different renditions to match the parameters/attributes of another rendition. The renditions having matching parameters/attributes (including one or more normalized/transformed renditions) can then be analyzed for QC purposes using techniques for image/video comparison and/or audio comparison.

These techniques may be based on existing techniques, e.g., peak signal to noise ratio (PSNR) analyses, that are tuned in dependence on the type and degree of normalization/transformation used to generate the matching renditions. In some embodiments, additional pre-processing steps can be applied to reduce the computational burden for the image/video comparison and/or audio comparison, with only a minor effect on the accuracy of the comparison, to optimize the QC analysis.

In media operations, multiple different renditions or renditions of the same media content are often delivered to a content host. In some scenarios, these different renditions are delivered days apart. In one example, a high definition (HD) file package for a two-hour movie may be received on a first day (e.g., a Monday) requiring immediate quality control (QC) analysis, while an ultra-high definition (UHD) file for the same two-hour movie may be received a week later (e.g., the following Monday), requiring a separate QC analysis. The file package can include media files such as one or more video files and one or more associated audio files, and/or one or more associated subtitle files.

The QC process can include running automated test suites, e.g., Interra BATON or Telestream Vidchecker, against the media file(s). In these tests, aspects of the file package, video and audio may be analyzed. In various non-limiting examples, the automated tests may: analyze the file package to, e.g., identify attributes/parameters of the file package (timecode, metadata, etc.) and/or identify a mismatch between the durations of the audio and video files; analyze the video to, e.g., identify attributes/parameters of the video (resolution, aspect ratio, color information, etc.) and/or identify any black frames present; and/or analyze the audio to, e.g., identify attributes/parameters of the audio (sampling frequency, codec type, number of channels (stereo vs. surround)) and/or identify parts of the audio with excessive loudness. As would be understood by those skilled in the art, some issues may be missed by the automated tests (e.g., artifacts in the video).

To ensure that no issues missed in the automated tests remain, prior to release of the content by the content host, a QC operator will generally watch the full content. As such, a single QC pass on a 2-hour movie takes more than 2 hours to run all automated tests and then visually QC. Currently, in the case of multiple renditions (e.g., HD and UHD) of the same media content, this multi-hour process is repeated each time for each rendition (for example, once for HD and then the following week again for the UHD media).

Traditional solutions for analyzing multiple related image/video files may include, for example, a frame-by-frame comparison of the related files. For example, a video may be compressed and reconstructed, and the reconstructed video may then be compared to the original video to determine the quality of the reconstruction. However, these traditional solutions do not work on media files with differing parameters/attributes (e.g., different resolutions, color spaces, frame rates, etc.). In some scenarios, for these solutions, the media files need to be synchronized in time and form so that pixels from one rendition of the media file may be directly compared to the corresponding pixels from another rendition.

In one example, a peak signal-to-noise ratio (PSNR) analysis is a well-known algorithm in image/video processing for analyzing differences between images. PSNR techniques are commonly used to calculate the performance of compression codecs, wherein images are compressed and reconstructed, and the original rendition of each image is compared to a reconstructed rendition of that image. In general, a higher calculated PSNR value indicates a higher quality reconstruction of the image (although the range of PSNR values indicating a valid reconstruction may differ between applications and must be carefully selected). PSNR solutions in use today generally do not work for QC purposes as described above because PSNR is unsuitable for the comparison of media renditions having differing resolutions, aspect ratios, frame rates etc.

Figure 1A:
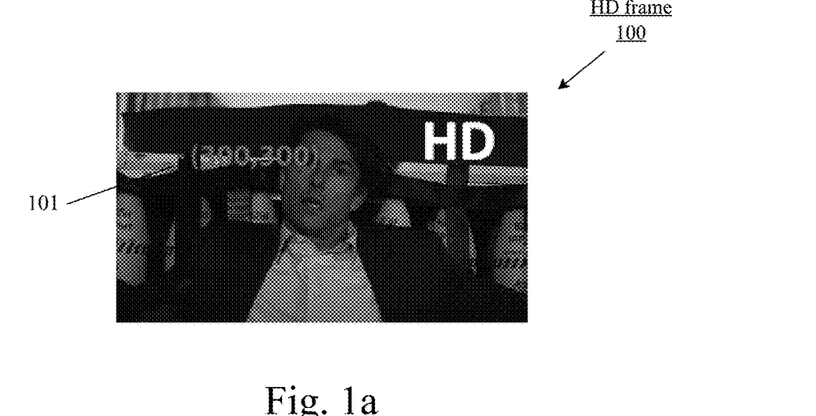
FIG. 1a shows a frame of an HD rendition of video content.
Figure 1B:
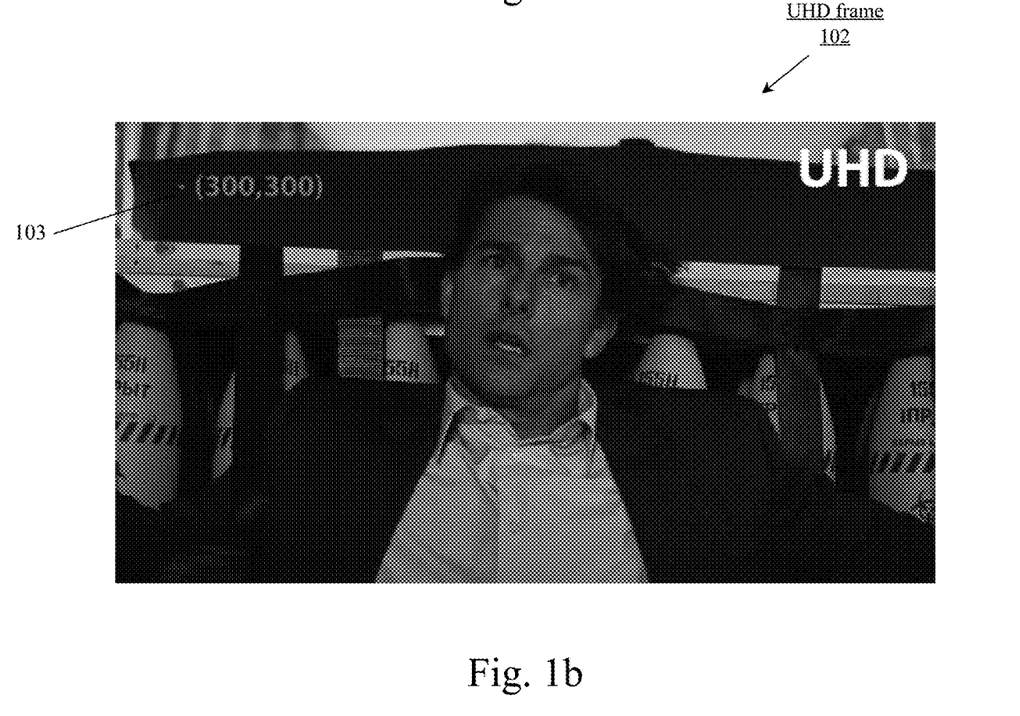

FIG. 1*a* shows a frame 100 of an HD rendition of a media content asset; and FIG. 1*b* shows a frame 102 of a UHD rendition of the same media content. As shown in FIGS. 1*a-b*, the pixel 101 at (x, y) coordinates (300, 300) of the HD frame 100 is in a very different position within the image from the pixel 103 at the same (x, y) coordinates of the UHD frame 102. Thus, traditional solutions for comparing media content cannot be used to compare the HD frame 100 and the UHD frame 102 because the pixels of these media content renditions do not match one another. Similarly, a pixel-for-pixel analysis may not work if the color spaces of the two renditions are different and comparing frame-by-frame will not work if the frame rates are different, even if the resolutions of the two renditions are the same.

According to various exemplary embodiments, different renditions of the media content asset having different attributes or parameters can be compared, for quality control (QC) purposes, by normalizing one or more attributes of one or more of the different renditions. In a first non-limiting example, a first rendition of a media content asset is a high definition (HD) rendition and a second rendition of the media content is an ultra-high definition (UHD) rendition. In another example, the first rendition of the media content has a standard dynamic range (SDR) color space and the second rendition of the media content has a high dynamic range (HDR) color space.

In still another example, the first and second renditions of the media content have different frame rates. In these examples and further examples, as will be described in detail below, one or more parameters of one or both of the renditions of the media content is scaled or otherwise normalized/adjusted to allow for direct comparison using a frame-by-frame video analysis methodology, e.g., PSNR, to calculate differences between the first and second renditions. A transformed rendition of either one or both of the first and second renditions is associated with or defined by parameters/attributes, e.g., a resolution, color space, frame rate, etc., that match those attributes of the other rendition. In some embodiments, one rendition has been previously validated by QC processes (e.g., no errors were found, or only minor errors/issues were identified and determined to be insignificant), such that differences identified in the comparative analysis may be identified as potentially significant errors/issues in the rendition that has not yet been validated by QC processes.

It should be understood that the terms "media content" and "media content asset" as used herein, may refer to a film, a television show, a clip, or another type of video content. In some embodiments, the video content has audio content associated therewith. In some embodiments, the media content refers to audio content only, e.g., an audio recording. The media content can be represented in multiple different renditions or renditions having different attributes or parameters associated therewith.

Those skilled in the art will ascertain that media content can be defined by attributes/parameters including but not limited to: a resolution, or a number of pixels per row/column per frame, e.g., high definition (full HD) (1920×1080 pixels or 1080p/1080i) or ultra-high definition (3840×2160 pixels or 2160p); an associated aspect ratio for display, e.g., 4:3 or 16:9, and/or original aspect ratios (with or without black pillarbox or letterbox bars); a color space or dynamic range, e.g., SDR (Rec. 709) or HDR (Rec. 2020); a frame rate, e.g., 30 frames per second (fps) or 24 fps; and/or audio parameters including, e.g., a type of codec, a sampling rate, a number of channels (stereo vs surround sound), etc.; and/or other parameters.

The exemplary embodiments are further described with regard to a comparison of a first rendition of a media content defined by first values for attributes/parameters of the media content to a second rendition of the media content defined by second values for the attributes/parameters, wherein at least one of the first values does not match the corresponding second value for the corresponding attribute parameter. However, it should be understood that any number of renditions of the media content, each defined by one or more differing parameter values relative to those of the other renditions, may be compared using the exemplary techniques described herein.

The exemplary embodiments are further described with regard to image/video comparison techniques employing, e.g., a peak signal to noise ratio (PSNR) analysis. However, those skilled in the art will understand that other types of image/video comparison techniques may be used such as, for example, PSNR, SSIM (Structured Similarity Index Method), and Video Multi-Method Assessment Fusion (VMAF). Those skilled in the art will understand that these types of comparative analysis often require, to operate properly, matching properties/attributes between the images/videos to be compared, e.g., matching sizes and dimensions for the pixels of the images/frames, matching frame rates, matching color spaces, etc. Different types of image/video comparison techniques may have different input requirements in order to generate useful results that are not hidden by noise.

In some embodiments, a single parameter/attribute of a first rendition of a media content can be scaled up or down, or otherwise adjusted, e.g., normalized, to match that of a second rendition of the media content. A transformed rendition of the first rendition of media content can be generated that is associated with and/or defined by the adjusted parameter value. The transformed rendition can be directly compared to the other rendition using techniques for image comparison, e.g., PSNR, to be described in detail below. In some embodiments, multiple parameters/attributes of the first rendition of media content can be scaled/adjusted to match those of the second rendition, or one or more parameters/attributes of both the first and second renditions can be scaled/adjusted to match those of the other rendition.

The methods by which one rendition of a media content asset is normalized, scaled up or down, or otherwise adjusted, depends on the type of parameter (s) requiring normalization and the degree of normalization, as described in further detail in the following exemplary embodiments. The normalization can be done "on the fly" (e.g., not in separate transcode steps). The method selected for scaling/adjusting the media content may affect the design of the comparison analysis, e.g., the range of acceptable PSNR values for validating the comparison analysis (e.g., validating that no significant issues exist in the rendition (s)—no issues exist or only minor issues that require no correction exist in the rendition (s) of media content), as described in further detail below. Additional pre-processing steps may be taken to reduce the computational load of the PSNR analysis, as will be described in further detail below.

In one exemplary embodiment, the resolution (pixel arrangement/size) of a first rendition of the video content is adjusted, scaled or otherwise normalized to match the resolution of a second rendition of the video content. In this embodiment, the first rendition of the media content is video content defined by a first resolution and the second rendition of the media content is video content defined by a second resolution. In one example, the first rendition is an HD rendition (full HD, 1080p or 1080i) and the second rendition is an UHD rendition (2160p) of the video content. Those skilled in the art will understand that each frame of an HD video has a resolution of 1920×1080 pixels (2,073,600 pixels) and each frame of an UHD video has a resolution of 3840×2160 pixels (8,294,400 pixels)—exactly four times the number of pixels of each HD video frame.

For some image comparison techniques, e.g., PSNR analyses, to work correctly, the resolutions for the two images to be compared must match. Thus, either the first rendition may be scaled up to generate a transformed first rendition defined by an UHD resolution, or the second rendition may be scaled down to generate a transformed second rendition defined by an HD resolution. Those skilled in the art will understand that, alternatively, both renditions may be scaled to a third, common resolution level but this is likely to be computationally inefficient. The PSNR analysis may then be performed between the transformed first rendition and the original second rendition (in matching UHD resolutions), or between the original first rendition and the transformed second rendition (in matching HD resolutions).

As would be understood by those skilled in the art, there are various known scaling techniques that comprise, for example, averaging techniques (e.g., four pixels of the UHD rendition are averaged to match to a corresponding single pixel of the HD rendition), extrapolation techniques (e.g., where a single pixel of the HD rendition is copied four times for comparison to a corresponding four pixels of the UHD rendition), or interpolation techniques such as nearest neighbor, bilinear and bicubic as would be understood by those skilled in the art. Of course, these scaling techniques must also consider potentially differing aspect ratios, to be described in greater detail below. However, assuming that two renditions of video content differ only in a number of pixels, while all other qualities relevant to the PSNR analysis (including aspect ratio) are matched, the normalization steps may include only a normalization of the resolutions.

In some scenarios, it may be preferred to scale the UHD rendition down to HD to perform the comparison analysis. For example, some scaling up techniques (e.g., from HD to UHD) may introduce more noise or artifacts than would a corresponding scaling down technique. This added noise may then impact the trustworthiness of the comparison analysis with regard to its intended use for QC of the original renditions. Additionally, the scaling down will reduce the computational load for the image analysis to be performed between the frames of the renditions. In other scenarios, it may be preferred to scale the HD rendition up to UHD to perform the comparison analysis.

It should be understood that different renditions of video content may have resolutions different from those of UHD or HD. For example, a rendition of video content may be standard definition (SD) and have a resolution of 720×480; 720p high definition and have a resolution of 1280×720; or have some other resolution such as 8k (7680×4320). The techniques described in the above example can be applied in a similar manner regardless of the relative numbers of pixels of the different renditions of media content.

Those skilled in the art will understand that different resolutions (e.g., HD or UHD) may also be associated with different aspect ratios. For example, SD is generally associated with a 4:3 aspect ratio (although content may be provided, for example, in SD with an anamorphic aspect ratio of 16×9); HD (full HD 1080p or 1080i) is generally associated with a 16:9 aspect ratio; UHD (3840×2160) is also generally associated with a 16:9 aspect ratio; and 4K (4096×2160) at a 1.9:1 aspect ratio, etc. Thus, to properly compare different renditions of video content, the aspect ratio of a first rendition of video content may also be cropped and/or scaled up/down to match that of a second rendition of the video content.

In another exemplary embodiment, the aspect ratio of a first rendition of video content is normalized to match the aspect ratio of a second rendition of the video content. It should be understood that the resolution and the aspect ratio can be scaled or otherwise adjusted in a single transformation calculation process, or they can be scaled/adjusted in separate transformation calculation processes. In this embodiment, the first rendition of the media content is video content defined by a first aspect ratio and the second rendition of the media content is video content defined by a second aspect ratio.

In one example, the first rendition is an HD rendition (full HD, 1080p) and the second rendition is a 4K rendition (4096×2160) of the video content. Those skilled in the art will understand that each frame of an HD video has an aspect ratio of 16:9 and each frame of a 4K video has an aspect ratio of 1.9:1. As described above, for some image comparison techniques, e.g., PSNR analyses, to work correctly, the aspect ratios for the two images to be compared must match. Thus, either the first rendition may be transformed to generate a transformed first rendition defined by a 1.9:1 (4K) aspect ratio, or the second rendition may be transformed to generate a transformed second rendition defined by a 16:9 (HD) aspect ratio. The PSNR or other such analysis may then be performed between the transformed first rendition and the original second rendition (in matching 4K aspect ratios), or between the original first rendition and the transformed second rendition (in matching HD aspect ratios).

The aspect ratio transformation techniques may include interpolation/averaging techniques, extrapolation techniques, or some combination of these techniques. As described above, these transformation techniques must also consider potentially differing resolutions.

In some examples, an original rendition of the video content may have been released (or originally created/shot) with some aspect ratio different from the aspect ratio of the rendition currently under analysis. In other words, in some scenarios, black bars (e.g., letterboxing or pillarboxing) may have been introduced to a rendition of the video content. In these scenarios, in a related embodiment, the transformation of the one or more different renditions of the video content is performed in consideration of the inclusion of the black bars in the one or more renditions (e.g., by removing black bars from one rendition or by adding to one rendition black bars corresponding in size and position to those included in another rendition of video content to be compared).

In some other examples, a first rendition of video content may include content not included in a second rendition of the video content. For example, one rendition may have an extended field of view on the sides and/or top/bottom of the video frames relative to the video frames of the other rendition. In these embodiments, additional content included in one rendition and not found in the other rendition may be removed. Of course, if the rendition from which the additional content is removed is the subject of the QC analysis (e.g., the rendition not previously QC'd), the removed portion will not be analyzed in the image comparison and thus may include errors not caught in this particular analysis.

It should be understood that different renditions of video content may have aspect ratios different from those of UHD and HD. For example, a rendition of video content may be standard definition (SD) and have an aspect ratio of 4:3 while the introduction of letterbox bars may embed 2.35:1 or 2.4:1 content into a 16:9 HD or UHD frame. Similarly, pillarbox bars may embed 14:9 or other aspect ratio content into a 16:9 frame. As would be understood by those skilled in the art, the techniques described in the above example can be applied in a similar manner regardless of the relative aspect ratios of the different renditions of media content.

In another exemplary embodiment, the color space of a first rendition of video content is normalized to match the color space of a second rendition of the video content. In this embodiment, the first rendition of the media content is video content having by a first dynamic range and the second rendition of the media content is video content having a second dynamic range. In one example, the first rendition is a standard dynamic range (SDR) rendition (Rec. 709) of the video content and the second rendition is a high dynamic range (HDR) rendition (Rec. 2020) of the video content.

In a further exemplary embodiment, video data can be converted to, or extracted as, YCbCr (where Y is luminance), or RGB can be converted directly to luminance values, and then the PSNR or other such calculations can be applied only to the luminance data to accelerate the calculations. Those skilled in the art will understand that such a process may potentially hide certain color artifacts. However, the user may make the determination that missing these color artifacts is a reasonable cost to pay to obtain the enhanced efficiency of calculations this affords.

Those skilled in the art will understand that frames of an HDR video may include pixels in a color space much broader than the pixels in frames of an SDR video. As described above, for some image comparison techniques, e.g., PSNR analyses, to work correctly, the color spaces for the two images to be compared must match. Thus, either the first rendition may be transformed to generate a transformed first rendition defined by a HDR color space, or the second rendition may be transformed to generate a transformed second rendition defined by an SDR color space. The PSNR analysis may then be performed between the transformed first rendition and the original second rendition (in matching HDR color spaces), or between the original first rendition and the transformed second rendition (in matching SDR color spaces).

The color space transformation techniques can comprise any known techniques including, for example, interpolation/averaging techniques, extrapolation techniques, or any combination of these techniques.

It should be understood that different renditions of video content may have color spaces different from those of HDR or SDR. As would be understood by those skilled in the art, the techniques described in the above example can be applied in a similar manner regardless of the relative color spaces of the different renditions of media content.

In still another exemplary embodiment, a frame rate of a first rendition of video content is normalized to match a frame rate of a second rendition of the video content. In this embodiment, the first rendition of the media content is video content having a first frame rate and the second rendition of the media content is video content having a second frame rate. In one example, the first rendition has video content with a frame rate of 30 fps and the second rendition has video content with a frame rate of 24 fps.

As described above, for some image comparison techniques, e.g., PSNR analyses, to work correctly, the frame rate for the two videos to be compared must match. Thus, either the first rendition may be transformed to generate a transformed first rendition defined by a 24 fps frame rate, or the second rendition may be transformed to generate a transformed second rendition defined by 30 fps frame rate. The PSNR analysis may then be performed between the transformed first rendition and the original second rendition (in matching 24 fps), or between the original first rendition and the transformed second rendition (in matching 30 fps).

The frame rate transformation techniques for use with the exemplary embodiments may comprise, for example, telecine (3:2 pulldown), interpolation/averaging techniques, extrapolation techniques, or some combination of these techniques. In some scenarios, it may be preferred to scale down to the lower frame rate. It is noted that scaling down may introduce additional noise relative to scaling up. To compensate for this possibility, the PSNR analysis may include lower PSNR thresholds to indicate a valid comparison between the renditions, as will be described in greater detail below.

In another exemplary embodiment, an audio parameter of a first rendition of audio content is normalized to match the corresponding audio parameter of a second rendition of the video content. In this embodiment, the first rendition of the media content is, for example, audio content defined by a particular codec, sampling rate, or number of distinct channels (stereo vs surround sound) and the second rendition of the media content is audio content defined by a particular codec, a sampling rate, or a number of distinct channels (stereo vs sound) different from that of the first rendition. As described above, for some audio comparison techniques to work correctly, the audio parameters for the two audio files to be compared must match. Thus, either the first rendition may be transformed to generate a transformed first rendition matching the second rendition, or the second rendition may be transformed to generate a transformed second rendition matching the first rendition. The analysis may then be performed between the transformed first rendition and the original second rendition, or between the original first rendition and the transformed second rendition.

It should be understood any of the parameters/attributes defining the rendition of the media content, as described in the exemplary embodiments above, may be scaled up, scaled down, or otherwise adjusted to match the corresponding parameters/attributes defining another rendition of the media content. In some embodiments, only a single parameter/attribute is adjusted for a first rendition in generating a transformed first rendition. In other embodiments, multiple parameters/attributes are adjusted for a first rendition to generate a transformed first rendition. In still other embodiments, one or more parameters/attributes of each rendition are adjusted, and transformed to generate transformed first and second renditions. In one illustrative example, the resolution is scaled down on the first rendition, but the dynamic range is scaled down on the second rendition.

If desired, normalization may be done "on the fly" as part of this process—i.e., not in separate transcode steps, as will be described in further detail below with regard to the flowchart 200 of FIG. 2. As would be understood by those skilled in the art, the creation of work-product transcodes as pre-processing steps may result in suboptimal use of computing resources. Based on the amount of normalization required in this step, the allowable difference between pixels of corresponding frames of video (as represented in the PSNR values) may be tuned. This may allow, for example, a lower PSNR range to be acceptable in view of greater differences in the resolution, color space, frame rates, etc., of the source media files, as will be described in greater detail below.

The comparative analysis (e.g., PSNR analysis) may be performed between an original rendition and a transformed rendition or between two transformed renditions. In some embodiments, one of the two renditions that was previously analyzed for QC purposes and determined to be error-free (or including only insignificant errors that can be ignored without detracting from user experience during playback) may be considered a baseline from which errors or issues may be identified in another rendition which has not yet been fully analyzed for QC.

When PSNR is used, each frame of one rendition is compared directly to a corresponding frame of the other rendition and a PSNR value for each of these frame pairs is determined. In general, a higher calculated PSNR value indicates a higher correspondence between the frames (fewer differences) while a lower calculated PSNR value indicates a lower correspondence between the frames. In some examples, a given range of PSNR values (or minimum/maximum PSNR thresholds) can be indicative of particular errors/issues or differences between the frames.

In the present embodiments, the PSNR analysis may be designed in consideration of: the type (s) of errors expected between the two renditions of the media content; the magnitude of the errors expected between the two renditions of the media content; the type (s) of normalization used to generate renditions that can be compared; and the magnitude of the normalization. In one illustrative example, common issues identified in QC of video content include glitches due to shuffled frames, missing/extra frames, or black frames, and artifacts in the video content.

The signature of these issues, in a single instance or over time, can be represented in the output of the PSNR analysis. For example, a plot of the PSNR value relative to time or frame number can show a large drop in PSNR value during a particular time duration. This could potentially indicate a mismatch in the content represented in the respective frames (e.g., shuffled/missing/added frames). In various embodiments, the range of or threshold PSNR values indicating issues/errors or no issues/errors may differ between applications and must be carefully selected.

Figure 2:
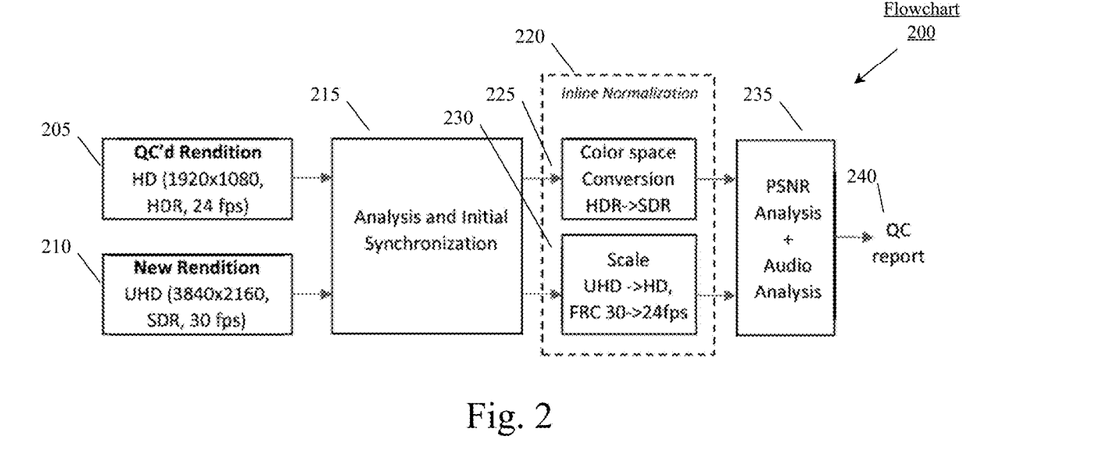
FIG. 2 shows a flowchart for an exemplary automated quality control (QC) analysis including pre-processing steps for normalizing the attributes of two renditions of media content having one or more differing attributes according to one example.

FIG. 2 shows a flowchart 200 for an exemplary quality control (QC) analysis including pre-processing steps for normalizing the attributes of two renditions of media content having one or more differing parameter values or attributes according to one example. The steps of the flowchart 200 may be executed by a content host such as the content host 315 of the system 300 described in FIG. 3.

As would be understood by those skilled in the art, the content provider may be a production company that films, edits, and delivers a finished episode of a film or TV show, etc. that is internal or external to the company that is the content host. In an exemplary embodiment, when a finished piece of content is delivered into the media supply chain of the content host, metadata (e.g., title metadata including data such as the name of the content, an episode number if applicable, season identifier, etc.) as well as technical metadata (e.g., resolution and/or aspect ratio data) is entered, for example, into a content management system (CMS).

After this, the delivered content may go through automated QC (e.g., Interra BATON, Telecine Vidchecker, etc.) and/or manual QC (eyes on screens), and if a check of the CMS reveals that this is a rendition of existing content, the method described herein may be applied to more efficiently perform the quality control analysis using the results of a prior QC analysis on a previously reviewed rendition of the same content. As would be understood by those skilled in the art, once a rendition has passed the QC analysis, it is made available for distribution (e.g., broadcast on television or cable, delivered as VOD content, shown in a theater, made available on a streaming platform such as Paramount+, etc.).

Figure 3:
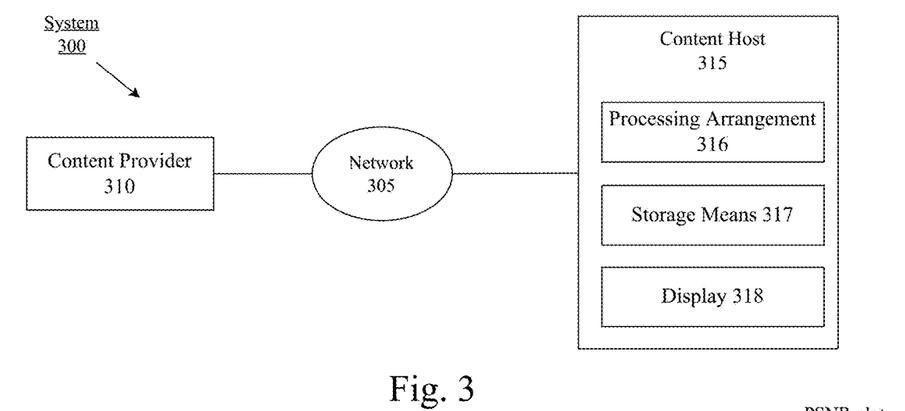
FIG. 3 shows an exemplary system for quality control (QC) analyses according to various exemplary embodiments.

FIG. 3 shows an exemplary system 300 for quality control (QC) analyses according to exemplary embodiments. The system 300 includes a network 305 providing network access to a content provider 310 and a content host 315. As would be understood by those skilled in the art, the content provider 310 may have limited or no access to the network 305 beyond that required to deliver the content to the content host 315. The network 105 may represent one or more networks. The content provider 310 and the content host 315 may each connect to the network 305 in any manner (e.g., wirelessly or using a wired connection). Those skilled in the art will understand the procedures and protocols that may be implemented for each of the content provider 310 and the content host 315 to connect to the network 305 and communicate with a remote endpoint via the network connection.

For example, the network 305 may comprise a cloud computing platform including network protocols for communications between the content provider 310 and the content host 315. In the example of FIG. 3, the content provider 310 and the content host 315 are shown as having a wired connection to the network 305. It should be understood that each of the content provider 310 and the content host 315 may connect in any manner to the network 305. In addition, the network 105 may represent one or more networks. For example, the entity providing the content host 315 may have an internal network (e.g., LAN) that connects to the public Internet to provide various services. Thus, it should be understood that network 305 may represent any manner and/or network used to connect the various components of the system 300.

The content provider 310 of this embodiment provides media content, e.g., video content and/or audio content, to the content host 315 via the network 305 or through any other method (e.g., via the physical delivery of data storage items including the content). The content host 315 of this embodiment includes a processing arrangement 316, a storage arrangement 317 (e.g., a database) storing media content, e.g., video content and/or audio content received from the content provider 310, and a display 318. It should be understood that the content host 315 may include a number of different processing arrangements 316, storage 317 or displays 318 located at a number of different devices. The content host 315 further includes a communications interface (not shown) configured to perform communications via the network, including communications with the content provider 310.

In some non-limiting examples, the content host 315 includes one or more user devices, servers, or other devices. The user device may be any type of electronic component configured to communicate via a network, e.g., a mobile phone, a tablet computer, a smartphone, a laptop computer, a desktop computer, a set top box, a multimedia receiver, a smart TV, a game console, a wearable device, an internet of things (IoT) device, etc. Thus, the user device may represent any electronic device equipped with hardware, software and/or firmware configured with a processor for performing communications with the content provider 310 via the network 305. The content host 315 may include any number of user devices used by any number of users, any number of servers, or any number of other devices interconnected in any known manner.

The content host 315 (e.g., a user device thereof), in an exemplary embodiment, stores in the storage 317 multimedia data received directly or indirectly from the content provider 310. The multimedia data may, in some embodiments, include video content. The video content may include, in some embodiments, multiple different renditions or renditions of the same video content. Those skilled in the art will understand that the storage 317 may comprise multiple databases and may include additional content stored for use by the content host 315. Additionally, the storage 317 may be maintained remotely from the content host 315.

In some embodiments, a user device may access the storage 317 via a user-facing application. In other embodiments, the user device may access the storage 317 via a web browser. However, any reference to the user device accessing the storage 317 in any particular manner is provided for illustrative purposes only. The exemplary embodiments may apply to the user device accessing the storage 317 in any appropriate manner as would be understood by those skilled in the art.

The content host 315 (e.g., a user device) can execute a number of modules of the processing arrangement 316. In some non-limiting examples, the processing arrangement 316 may include modules for initial content analyses, normalization, comparative analyses, and presentation to a user via the display 318. The module for initial content analyses may perform operations including, e.g., checking if a duplicate rendition exists in a content management system (CMS), and/or running one or more automated tests on media content stored or accessed by the content host 315.

This module may, for example, identify parameters/attributes of the media files, determine whether a mismatch exists between the parameters/attributes of two renditions of the same media content, and determine how to convert certain parameters/attributes of one rendition into the parameters/attributes of the other rendition. This module can additionally determine whether any synchronization errors exist between the renditions and, in some embodiments, correct the synchronization error or otherwise synchronize the renditions in a manner suitable for a comparative analysis, to be described in further detail below in step 215 of FIG. 2.

The module for normalization may generate one or more transformed renditions of the media content with adjusted parameters/attributed in a manner suitable for the comparative analysis, as described above and to be described in further detail below in step 220 of FIG. 2. For example, normalization techniques can be used to scale or otherwise adjust the media content so that the parameters match between the renditions to be compared.

The module for comparative analysis may perform operations including comparative analysis, e.g., PSNR analysis, on the media content with matching parameters, as will be described in further detail below in step 235 of FIG. 2. The module for presentation to the user may perform operations including providing to the user, via the display 318, a representation of the results of the comparative analysis, as will be described in further detail below in step 240 of FIG. 2. The module for presentation may present the results of the comparative analysis including, in some non-limiting examples, error identification for particular frames or frame ranges, error classification, or a plot of the PSNR values relative to a frame or timecode.

Returning to the flow diagram of 200, in 205, a first rendition of the media content is received, e.g., at the content host 315 from the content provider 310 via the network 305, and stored, e.g., at the storage 317. The first rendition of the media content comprises, in this example, video content defined in HD (1080p), an HDR color space, and a 24 fps frame rate. In some examples, the media content may be received for the present analysis after earlier processing/analysis at the content host 315.

In this example, it was determined (by checking the CMS or some other means) that the first rendition of the media content was previously analyzed by quality control (QC) at the content host 315 (or at another host or system from which the results of the previous QC analysis have been obtained). In some scenarios, the previous analysis included a full QC process including a manual operator watching the content from start to finish.

In other scenarios, the previous analysis included automated processes (e.g., Interra BATON or TeleStream Vidchecker) and/or both automated and manual operator QC. In 210, a second rendition of the media content is received. The second rendition of the media content comprises video content defined in UHD (2160p), an SDR color space, and a 30 fps frame rate. In this example, the second rendition of the media content has not been previously analyzed by QC. In some cases, the second rendition may be received from the content provider 310 at a time different from the first rendition.

In 215, initial analyses are performed to determine which pre-processing steps are to be implemented and which tuning parameters are to be used for the PSNR analysis. In some non-limiting examples, the following analyses may be performed: identifying parameters/attributes of the first rendition and the second rendition; determining which parameters do not match between the first and second renditions; determining if any synchronization errors/issues exist; and, in some cases, determining and correcting some initially detected errors. For example, an automated suite for video analysis (e.g., similar to Interra BATON or TeleStream Vidchecker), may be run to identify initial parameters material to the execution of the PSNR analysis.

In this initial analysis stage, the two renditions are synchronized. In one example, synchronization may be accomplished using audio synchronization methods. In another example, the synchronization may be based on an initial comparative analysis, e.g., PSNR analysis, not to be confused with the comparative analysis described below in 235.

In some cases, an initial synchronization analysis may be performed to initially identify a first set of errors, e.g., synchronization errors. It is noted that, in this example, the initial synchronization analysis may be performed differently from the PSNR analysis of step 235. For example, the initial synchronization analysis may be a faster and/or more coarse analysis for identifying, e.g., black frames or inserted or deleted frames present in the first or second rendition. To serve this purpose, the input renditions of the video content may be transformed in various ways to simplify the analysis and the synchronization analysis may be tuned to identify these specific types of initial errors. As would be understood by those skilled in the art, the content host 315 may choose to synchronize using either, for example, audio synchronization methods, or utilizing PSNR or other such values on the video. Synchronization may be one time or continuous.

In view of these initial analyses, the first and second versions are initially synchronized. The synchronization may be one time or continuous. For example, if a first rendition of a content item is continuous and a second rendition of the same content item has 10 seconds of black or different content inserted midway through, the content host 315 may need to resynchronize to continue the comparison. Those skilled in the art will understand that an exemplary system may further include a module for automatically repairing the second rendition by removing the extra material (e.g., the 10 seconds of black or different content).

In some embodiments, the initial errors detected in step 215 may be sufficiently significant to warrant correction at this stage—i.e., prior to the full comparative analysis of 235. For example, some synchronization errors may be automatically repaired to generate a corrected rendition of the video content. The repair may be a temporary on-the-fly repair, for purposes of the QC analysis, or the source file may be repaired/regenerated. In another example, the content host 315 may request a corrected rendition of the media content from the content provider 310. The initial errors may also be recorded to facilitate the full QC review of the later steps.

Additionally, in 215, it is determined which parameters/attributes to scale or otherwise adjust (and the degree of adjustment) in the normalization step of step 220. At this stage, it may be further determined whether and how to tune the PSNR analysis of 230 in view of the type/magnitude of normalization required, although this may also be determined after the normalization step of step 220.

In 220, one or more parameters/attributes of the first rendition and/or the second rendition are adjusted and one or more transformed renditions of the first rendition and/or second rendition are generated as described in detail in the exemplary embodiments above. In one aspect of step 220, in 225, the color space of the first rendition is scaled down from HDR to SDR. In another aspect of 220, in 230, the resolution of the second rendition is scaled down from UHD to HD and the frame rate of the second rendition is scaled down from 30 fps to 24 fps. It is noted that these scalings/adjustments may be performed separately or in combination with one another at one time.

It is noted that, in conjunction with step 220, certain additional pre-processing steps may be taken prior to performing the PSNR analysis, as will be described with regard to the optimizations described below. In one example, both renditions (both previously transformed/normalized, or one original and one previously transformed/normalized) may be further transformed to simplify the PSNR analysis.

In 235, the PSNR analysis is performed. Based on the amount of normalization required in step 220, the allowable difference between pixels of corresponding frames of video (as represented in the PSNR values) is tuned, allowing, for example, a lower PSNR for greater differences in the resolution, color space, frame rates, etc. of the source media files. Additional aspects of the PSNR analysis will be described below with regard to FIG. 4. An audio analysis may also be performed in 235.

In 240, the resulting PSNR analysis is then processed and/or sanitized for presentation to a human operator. In some embodiments, certain errors are automatically identified based on, e.g., abrupt changes in PSNR values for a frame or range of frames. In some non-limiting examples, the processing arrangement 316 may classify the issues it captures, e.g., glitches due to shuffled frames, glitches due to missing or extra frames, or any other kind of classification information. Rather than reporting each individual frame with errors, the processing arrangement 316 may generate error ranges (by timecode or by frame) for presentation in a report on the display 318 for a QC operator to view at the content host 315.

The error range (s) may be preloaded into the QC environment so that the operator may limit the visually check to only those portions of the original media file within which errors were identified. In some embodiments, the report may include a plot of the PSNR values relative to time/frame. In another embodiment, metadata resulting from the PSNR analysis may be fed downstream to the QC software or QC hardware environment for visual display of the file issues, to keep content review tooling used by the QC operators consistent.

Figure 4:
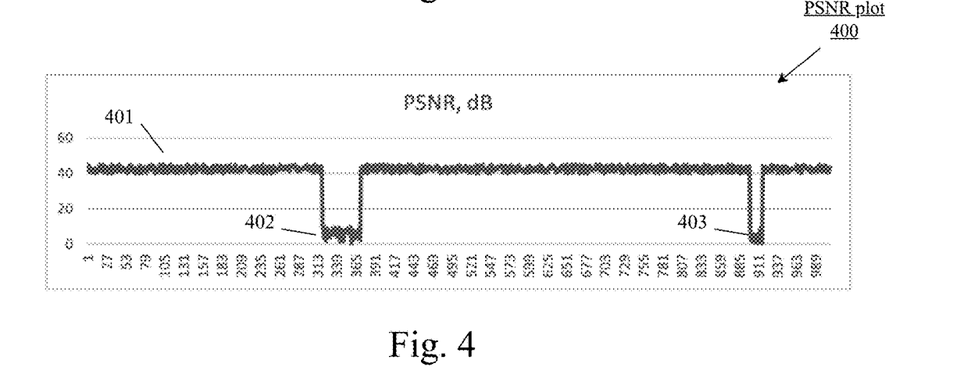
FIG. 4 shows an exemplary plot of PSNR values for a PSNR analysis of two different renditions of an exemplary video content.

FIG. 4 shows an exemplary plot 400 of PSNR values for a PSNR analysis of two renditions of an exemplary video content. The video content, in this example, includes 1008 frames corresponding to 42 seconds of content. A trace 401 shows the PSNR values per frame. Two areas of interest 402, 403 are identified, including one from frames 321-372 and a second one from frames 901-917. Rather than reporting 69 individual frames with errors, two error ranges (00:00: 13.09-00:00:15.12 and 00:00:37.13-00:00:38.05) are reported to the QC operator or delivered as metadata to the QC software environment.

In some scenarios, when errors are identified often or continuously across the files, the video content may be flagged for further (manual) review.

In not every scenario does a prior manual QC analysis need to be performed. For example, it may be desirable to run the PSNR analysis (and pre-processing normalization steps) as described above on two new files. Some initial issues in the first or second media content can be identified in this initial coarse PSNR analysis. Once issues are identified the content host can request corrected renditions from the content provider. In some scenarios, the content host can correct the issues in the one or more renditions of media content. In another example, the coarse PSNR analysis can be followed by a manual review to identify any further issues. Once any errors have been corrected and a new rendition of the media content has been fully QC'd, the PSNR analysis (and pre-processing normalization steps) may be performed again.

Using this approach, input media with differing file formats, resolutions, color spaces, frame rates, etc. can be compared to each other to massively speed up QC processes and any other processes that rely on such comparisons.

In the following, the calculation of PSNR is described in general and, in consideration of this calculation, additional aspects of these exemplary embodiments are described regarding optimizations to the PSNR analysis process. In one example, the calculation of PSNR for higher resolution content may require a substantially greater computational burden than the calculation of PSNR for lower resolution content. Certain enhancements may be made to the normalization and/or PSNR calculation steps, wherein certain parameters/attributes are reduced and/or modified to reduce the computational burden of the analysis. The modified analysis can be nearly as robust as the full analysis, while minimizing additional errors resulting from the modifications, in part through selective tuning of the PSNR acceptable ranges, as will be described in greater detail below.

The PSNR algorithm computes the peak signal-to-noise ratio, in decibels, between two images. This ratio is used as a quality measurement between the original and a compressed image. The higher the PSNR, the better the quality of the compressed, or reconstructed image. Video analysis is simply the image analysis of corresponding frames.

The mean-square error (MSE) and the peak signal-to-noise ratio (PSNR) are usually used to compare image compression quality. The MSE represents the cumulative squared error between the compressed and the original image, whereas PSNR represents a measure of the peak error. The lower the value of MSE, the lower the error.

To compute the PSNR, the mean-squared error (MSE) is first calculated, which is the mean of the square of the differences in the pixel values between the corresponding pixels of the two images. MSE is calculated using the following Equation 1.

$$MSE = \frac{\sum_{M,N}[I_1(m,n) - I_2(m,n)]^2}{M*N} \quad \text{Equation 1}$$

In the previous Equation 1, M and N are the number of rows and columns in the input images (i.e., the width and height), and $I_x$ (m, n) represents the pixel value on image x (image 1 or image 2) at location (m, n). The PSNR can be calculated using the following Equation 2.

$$PSNR = 10 \log_{10}\left(\frac{R^2}{MSE}\right) \quad \text{Equation 2}$$

In the previous Equation 2, R is the maximum fluctuation in the input image data type. In the case of 8-bit unsigned integer grayscale images (bit depth n=8), R is $2^{n-1}$ or 255

(255–0 is the maximum value range). For color images, one may think of the distance of two (R, G, B) values as the distance in 3D space between two (x, y, z) points on the RGB cube, and employ a 3D distance formula to find their distance according to the following Equation 3.

$$D = \sqrt{(R_2 - R_1)^2 + (G_2 - G_1)^2 + (B_2 - B_1)^2} \quad \text{Equation 3}$$

Using this approach, which is the most accurate, the maximum distance (R in the PSNR equation) from black (0,0,0) to white (255,255,255) would be approximately 441.673.

3D distance calculations are very math intensive. Comparing two HD (1920×1080) movies requires more than 2 million floating point distance calculations per frame. For a 2 hour and 11 minute movie, this corresponds to 2,073,600 pixels per frame×24 frames per second×60 seconds per minute×131 minutes=391 billion distance calculations. As would be understood by those skilled in the art, this represents a significant computational burden.

As an alternative to 3D distance, since the human eye is most sensitive to luminance information, PSNR may be computed for color images by converting the image to a grayscale luminance value using the well-known formula of Equation 4 which retains maximum distance R=255 in the PSNR algorithm described previously.

$$L = (0.299 * R) + (0.587) * G + (0.114 * B) \quad \text{Equation 4}$$

Unfortunately, calculating the luminance for L1 and L2 still requires 6 multiplications, so it has a complexity similar to that of the 3D distance formula.

According to additional aspects of these exemplary embodiments, the renditions of video content to be compared in the PSNR analysis may be pre-processed to reduce the computational complexity of the PSNR analysis. The frames (images) of the video content may be split into a regular grid of equal width and height N, e.g., 16×16 cells (N=16), and the pixels in each cell can be averaged. In the PSNR analysis, it is possible then to compare only the average color of all the pixels in the cell. This optimization substantially increases the speed of the PSNR analysis and has a relatively minor impact on accuracy for a sufficiently sized grid (e.g., as would be understood by those skilled in the art, a 2×2 may have a large impact on accuracy while a 1024×1024 grid may provide minimal improvement to the complexity of the PSNR analysis)

Distances between each of the grid squares may then be accumulated into a PSNR-like score. For example, an algorithm to compare and score two images image1 and image2 with N grid boxes each might look like:

```
int i, difference_r, difference_g, difference_b;
double accumulated_error = 0.0;
for (i=0; i<N; i++)
{
difference_r = (image1[i]).r – (image1[i]).r;
difference_g = (image1[i]).g – (image1[i]).g;
difference_b = (image1[i]).b – (image1[i]).b;
accumulated_error = accumulated_error + sqrt(difference_r
* difference_r + difference_g* difference_g +
difference_b* difference_b);
}
```

This accumulated_error is then used as a "score" for the comparison of those two frames. In an exemplary embodiment, when the accumulated_error is less than (6.0*N) the frames are determined to be a match. As compared to 0-60 PSNR score, this is 0 to a very large number (perhaps 300 digits long), allowing for finer grained comparisons. Either way, this method produces a score for the comparison of two frames and uses that score to identify frames that match so that the system can re-establish synchronization of the first and second renditions of the video after a first discontinuity has been found. Those skilled in the art will understand that the value used for identifying a match will vary based on the parameters used in determining, for example, cell size, etc. In addition, as this process may be resource intensive, the system may set a maximum duration for the search for a subsequent match after a discontinuity (e.g., 2 minutes) after which, if no point for re-synchronization has been identified, the process is ended.

Figure 5A:
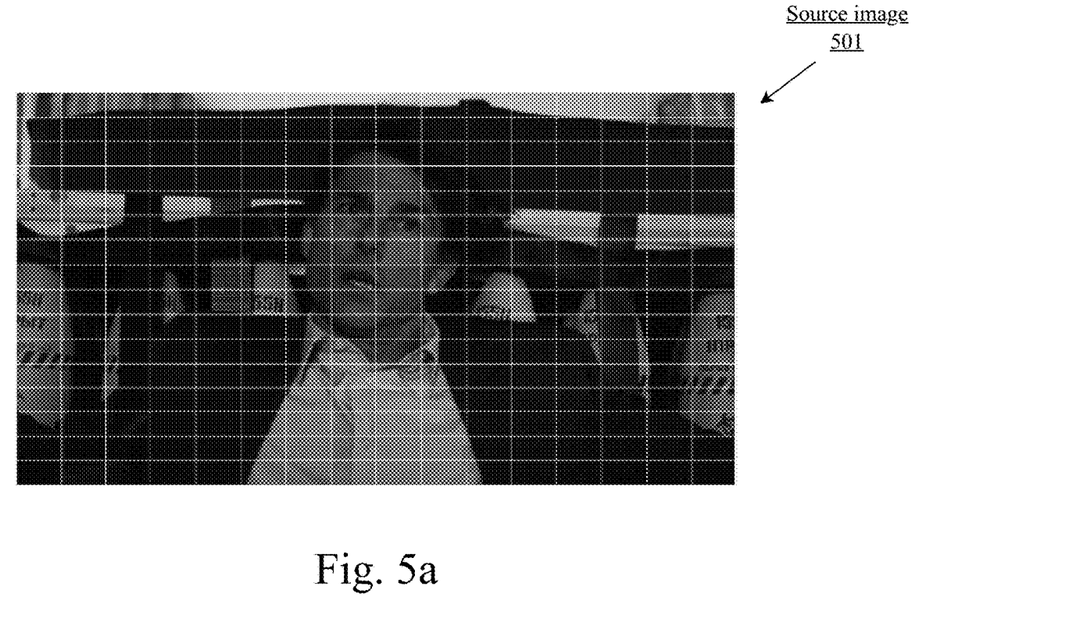
FIG. 5a shows a source image frame split into a grid of cells according to an optimization process.
Figure 5B:
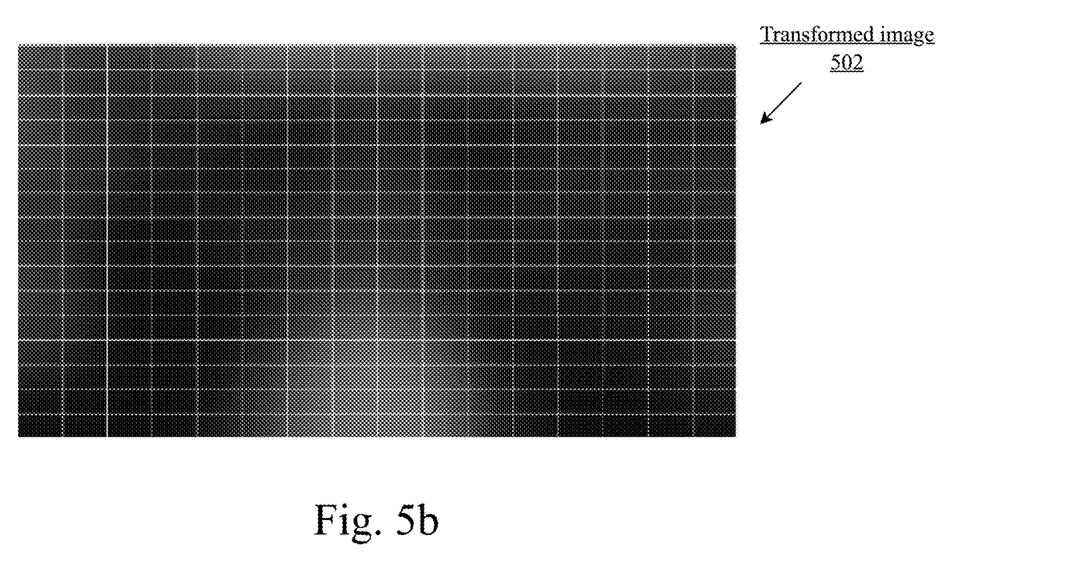
FIG. 5b shows a transformed image frame in which the pixels for each cell are averaged according to the optimization process.

FIG. 5a shows a source image frame 501 split into a grid of cells; FIG. 5b shows a transformed image frame 502 in which the pixels for each cell have been averaged.

Computing the average is simple math (e.g., addition and division) and, in this example, only 256 complex distances are computed between averages rather than 2 million per frame (an 8100× reduction) to compare two frames.

Figure 5C:
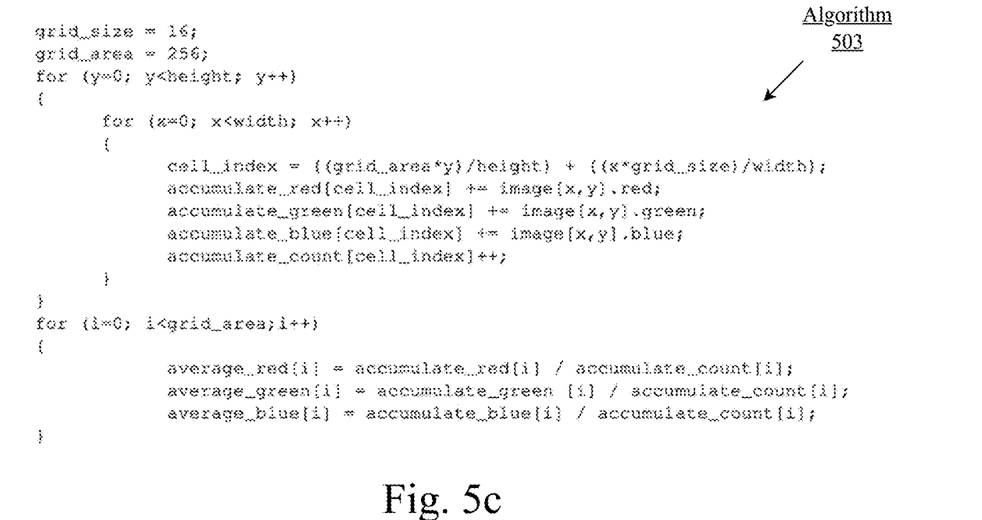
FIG. 5c shows algorithmic steps for computing the average for each cell according to the optimization process.

One exemplary algorithm for computing the averages simply loops through each pixel (x, y) in the image, accumulating the r/g/b values in an array of integers, and then ultimately dividing by the count. FIG. 5c shows algorithmic steps 503 for computing the average for each cell. Those skilled in the art will recognize that averaging pixels into an N×N grid is the same as scaling the source image (without maintaining its aspect ratio) to a final size of N×N.

Obviously, a larger grid (more cells) results in more accuracy at the cost of speed, allowing the user to tune for accuracy vs. speed. Each cell's average color may be one of 16.7 M values, allowing for surprisingly good recognition even for a limited grid size. The set of N average colors (N=256 in the example above) forms a 'signature' for an image or frame of video that may then be compared to other such signatures for fast and efficient visual image search. This is important when trying to perform fast and efficient video synchronization in the initial steps of the workflow (but is not useful for the second PSNR analysis which seeks to identify smaller glitches).

This optimization is also useful for searching or comparing images or frames of video of arbitrary sizes, number of colors (e.g. 8-bit (256) vs 24-bit (16.7 M)), aspect ratios, etc., as all of that image data is automatically distilled into a common signature (a grid of N values).

Figure 6:
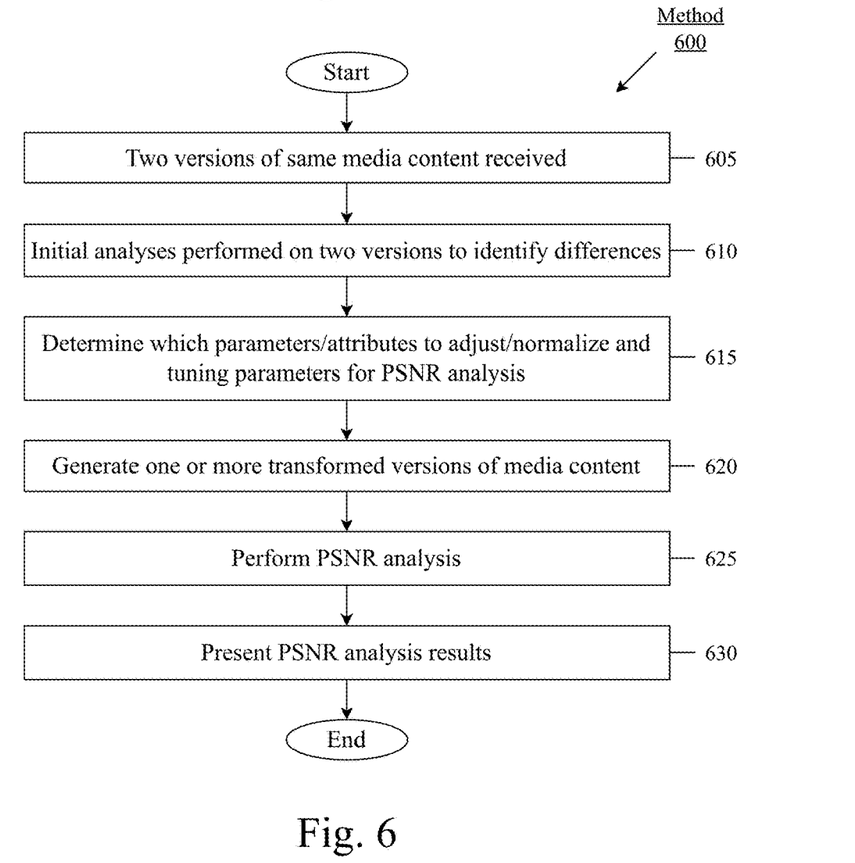
FIG. 6 shows a method for an exemplary quality control (QC) analysis.

FIG. 6 shows a method 600 for an exemplary quality control (QC) analysis. In 605, two renditions or renditions of the same media content are received. In some embodiments, one or the renditions was previously QC'd. When a new file comes in, a content management system (CMS) may be checked to determine whether there is a previously QC'd rendition to which this new rendition may be compared. However, this is not required. The two renditions are associated with and/or defined by certain parameters/attributes, wherein at least one parameter/attribute does not match between the two renditions.

In 610, initial analyses are performed to identify differences in the attributes/parameters of the two renditions. In some examples, differences in resolution, aspect ratio, frame rate, color space, or audio parameters may be identified. Additionally, differences in timing may be identified. In some scenarios, one rendition may include synchronization errors that can be corrected so that the renditions are synchronized.

In 615, based on the initial analyses, it is determined which parameters/attributes are to be normalized and what PSNR parameters to use in the PSNR analysis. In some scenarios, parameters of only one rendition are identified for adjustment to generate a transformed rendition. In other scenarios, parameters of both renditions are identified for adjustment to generate transformed renditions to achieve a match across all relevant parameters.

As would be understood by those skilled in the art, such transformed renditions may be stored only temporarily during the QC analysis and may, at any given time, consist only of a portion of the rendition that is currently being analyzed. For example, this transformed rendition may be generated and frame by frame or using a small buffer of frames which are deleted as their analysis is completed. Based on these determined adjustments/normalization parameters, it may then be determined where to set an acceptable range for PSNR.

Additionally, in this step, it may be determined whether to apply any additional pre-processing steps to the one or more transformed renditions and/or original renditions. For example, if a resolution is scaled up, it may be determined to apply additional pre-processing steps to optimize the analysis and reduce the computational burden of the PSNR analysis.

In 620, one or more transformed renditions of the first and/or second media content are generated. The parameters match (pixels per frame, frame rate, color, etc.), so the PSNR analysis can identify differences between the corresponding frames.

In 625, the PSNR analysis is performed on the one or more transformed and/or original renditions. The PSNR analysis can include an automatic identification and classification of errors.

In 630, the results of the analysis are presented to a user (directly or via the QC software) for further manual QC analysis. In one embodiment, a plot of the PSNR results vs. time can be presented. In another embodiment, portions of the media content potentially having issues are flagged. In another embodiment, the flagged portions of the media content are extracted as clips for review by the operator. In still another embodiment, the details of the pre-processing steps are presented for manual review. If the operator determines that some parameter should be adjusted, e.g., a type of normalization (scale up vs. down), different from the previous analysis, the operator can manually direct the execution of the process and generate new results.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above-described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method for comparing video content with different attributes, comprising:

determining for a first rendition of video content a first value for each of a plurality of video attributes of the first rendition of the video content;

determining for a second rendition of the video content a second value for each of the video attributes of the second rendition of the video content, the video attributes of the first and second renditions including parameters associated with a playout of the video content;

identifying a first one of the video attributes for which the first value is different from the second value;

determining scaling or adjustment parameters for matching or normalizing the first and second values of the first video attribute;

generating a transformed first rendition of at least the first rendition having an adjusted value for the first video attribute so that the video attributes of the transformed first rendition match the video attributes of the second rendition or a transformed second rendition;

performing a comparative video analysis between the transformed first rendition and the second rendition or the transformed second rendition to identify frames in which a comparative performance metric indicates a video error or video issue in the first rendition or the second rendition;

determining for a first rendition of audio content first values for each of a plurality of audio attributes and for a second rendition of audio content second values for each of the audio attributes, the audio attributes including parameters associated with a playout of the audio content;

identifying a first audio attribute for which the first audio attribute value is different from the second audio attribute value;

determining transformation parameters for matching or normalizing the first and second audio attribute values of the first audio attribute;

generating a transformed first rendition of at least the first rendition of the audio content having an adjusted value for the first audio attribute so that the audio attributes of the transformed first rendition of the audio content match the audio attributes of the second rendition of the audio content or a transformed second rendition of the audio content; and performing a comparative audio analysis between the transformed first rendition of the audio content and the second rendition of the audio content or the transformed second rendition of the audio content to identify frames in which a comparative audio performance metric indicates an audio error or issue in the first rendition of the audio content or the second rendition of the audio content.

2. The method of claim 1, wherein the first video attribute relates to frame or image properties, color properties, or a frame rate of the video content that, when generating the transformed first rendition of the video content, are adjusted up or down.

3. The method of claim 2, wherein the first video attribute comprises a resolution, the first value of the first video attribute indicating a first resolution different from a second resolution indicated by the second value of the first video attribute, the transformed first rendition of the video content having a transformed first resolution matching the second resolution or a transformed second resolution of the transformed second rendition of the video content.

4. The method of claim 3, wherein the first video attribute further comprises an aspect ratio, the first value of the first video attribute indicating a first aspect ratio different from a second aspect ratio of the second rendition of the video content indicated by the second value of the first video attribute, the transformed first rendition of the video content having the first aspect ratio or a transformed first aspect ratio matching the second aspect ratio or a transformed second aspect ratio of the transformed second rendition of the video content.

5. The method of claim 3, wherein the resolution of one of the first or second renditions of the video content is 1080p high definition (HD) and the resolution of the other one of the first or second renditions of the video content is 2160p Ultra HD (UHD).

6. The method of claim 2, wherein the first video attribute comprises black bar properties introduced in letterboxing or pillarboxing, the first rendition of the video content having first black bar properties different from second black bar properties of the second rendition of the video content, the transformed first rendition of the video content having transformed first black bar properties matching the second black bar properties of the second rendition or transformed second black bar properties of the transformed second rendition of the video content.

7. The method of claim 2, wherein the first video attribute comprises a dynamic range for a color space, the first value of the first video attribute indicating a first dynamic range different from a second dynamic range indicated by the second value of the first video attribute, the transformed first rendition of the video content having a transformed first dynamic range matching the second dynamic range or a transformed second dynamic range of the transformed second rendition of the video content.

8. The method of claim 7, wherein the dynamic range of one of the first or second renditions of the video content is standard dynamic range (SDR) and the dynamic range of the other one of the first or second renditions of the video content is high dynamic range (HDR).

9. The method of claim 2, wherein the first video attribute comprises the frame rate, the first value of the first video attribute indicating a first frame rate different from a second frame rate indicated by the second value of the first video attribute, the transformed first rendition of the video content having a transformed first frame rate matching the second frame rate of the second rendition of the video content or a transformed second frame rate of the transformed second rendition of the video content.

10. The method of claim 1, wherein the first audio attribute relates to a codec, a sampling frequency, or a number of channels of the audio content that, when generating the transformed first rendition of the audio content, are adjusted to a new value.

11. The method of claim 10, wherein the first audio attribute comprises the number of channels, the first rendition of the audio content having either stereo sound or surround sound and the second rendition of the audio content having the other one of either stereo sound or surround sound, the transformed first rendition of the audio content having a transformed first number of channels matching a number of channels of the second rendition of the audio content or a transformed number of channels of the transformed second rendition of the audio content.

12. The method of claim 1, wherein the transformed second rendition of the video content is generated having an adjusted value for a second one of the video attributes.

13. The method of claim 1, further comprising:
analyzing the first and second renditions of the video content to identify the first and second values for the video attributes and initial errors.

14. The method of claim 1, further comprising:
tuning the comparative video analysis based on the scaling or adjustment parameters.

15. The method of claim 1, further comprising:
analyzing results of the comparative video analysis to identify errors in the first or second renditions of the video content.

16. The method of claim 15, further comprising:
identifying individual frames or frame ranges as including the errors in the first or second renditions of the video content based on the results of the comparative video analysis.

17. The method of claim 15, further comprising:
presenting the results of the comparative video analysis on a display, the results including individual frames or frame ranges in which an error was detected or a plot of the comparative video analysis results per frame.

18. The method of claim 17, further comprising:
providing the individual frames or frame ranges in which the detected error was detected for manual review.

19. The method of claim 1, further comprising:
generating further transformed renditions of the first and second renditions of the video content to reduce a computational complexity of the comparative video analysis.

20. The method of claim 19, wherein the further transformed renditions of the video content comprise dividing each frame into a grid of cells and averaging pixels of each cell.

21. The method of claim 20, wherein the comparative video analysis is performed on averaged pixels of the further transformed renditions of the video content.

22. The method of claim 1, wherein the comparative video analysis includes a peak signal to noise ratio (PSNR) analysis.

23. The method of claim 1, wherein the first rendition of the video content or the second rendition of the video content was previously determined to be free of video errors so that the video error or video issue identified by the comparative video analysis indicates an error in the other one of the first rendition of the video content or the second rendition of the video content that was not previously determined to be free of errors.

24. The method of claim 1, wherein the first video attribute is an aspect ratio and wherein, when generating the transformed first rendition of the video content, at least one portion of each of images of the first rendition of the video content is cropped and/or panned to match an aspect ratio of the second rendition of the video content or the transformed second rendition of the video content.

25. A system for comparing video content with different attributes, comprising:
- a processor configured to:
  - determine for a first rendition of video content a first value for each of a plurality of video attributes of the first rendition of the video content;
  - determine for a second rendition of the video content a second value for each of the video attributes of the second rendition of the video content, the video attributes of the first and second renditions including parameters associated with a playout of the video content;
  - identify a first one of the video attributes for which the first value is different from the second value;
  - determine scaling or adjustment parameters for matching or normalizing the first and second values of the first video attribute;
  - generate a transformed first rendition of at least the first rendition having an adjusted value for the first video attribute so that the video attributes of the transformed first rendition match the video attributes of the second rendition or a transformed second rendition;
  - compare the transformed first rendition and the second rendition or the transformed second rendition to identify frames in which a comparative performance metric indicates a video error or video issue in the first rendition or the second rendition;
  - determine for a first rendition of audio content first values for each of a plurality of audio attributes and for a second rendition of audio content second values for each of the audio attributes, the audio attributes including parameters associated with a playout of the audio content;
  - identify a first audio attribute for which the first audio attribute value is different from the second audio attribute value;
  - determine transformation parameters for matching or normalizing the first and second audio attribute values of the first audio attribute;
  - generate a transformed first rendition of at least the first rendition of the audio content having an adjusted value for the first audio attribute so that the audio attributes of the transformed first rendition of the audio content match the audio attributes of the second rendition of the audio content or a transformed second rendition of the audio content; and
  - perform a comparative audio analysis between the transformed first rendition of the audio content and the second rendition of the audio content or the transformed second rendition of the audio content to identify frames in which a comparative audio performance metric indicates an audio error or issue in the first rendition of the audio content or the second rendition of the audio content.

* * * * *